United States Patent Office 2,783,232
Patented Feb. 26, 1957

2,783,232

PYRIDAZONE COMPOUNDS AND THEIR PREPARATION

Hugo Gutmann, Birsfelden, and Otto Isler, Basel, Switzerland, assignors to Hoffmann-La Roche Inc., Nutley, N. J., a corporation of New Jersey No Drawing. Application March 25, 1955,
Serial No. 496,923

Claims priority, application Switzerland April 2, 1954

9 Claims. (Cl. 260—250)

This invention relates to novel chemical compounds and to processes for their preparation. More particularly it relates to novel pyridazone compounds of the formula

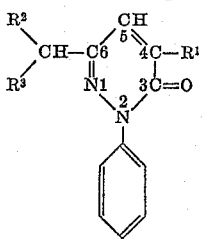

wherein $R^1$ represents lower alkyl, and
$R^2$ and $R^3$ each represents a member selected from the group consisting of hydrogen and lower alkyl, the sum of the carbon atoms in $R^1+R^2+R^3$ being an integer from 2 to 3;

and to novel processes and novel intermediates for preparing said compounds. The pyridazone compounds of the formula shown above are useful as medicinals, more particularly as antipyretic and analgesic compounds.

In one embodiment, the invention provides a comprehensive process for making the pyridazone compounds of the above formula, which process can be graphically illustrated by the following flow sheet, wherein $R^1$, $R^2$ and $R^3$ have the same meaning previously indicated, and R represents a member selected from the group consisting of hydrogen and lower alkyl:

FLOW SHEETS (I)

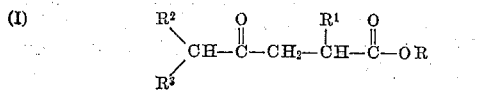

A levulinic acid (or lower alkyl ester thereof)

(II)

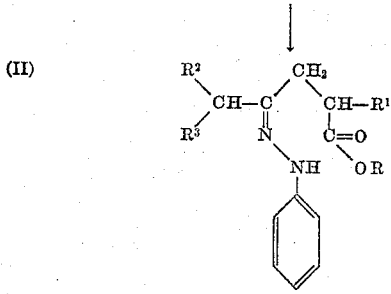

Phenylhydrazone of a levulinic acid (or lower alkyl ester thereof)

(III)

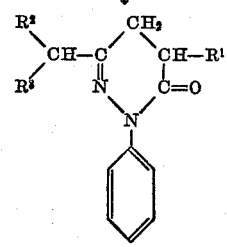

2-phenyl-4,6-di(lower alkyl)-4,5-dihydro-3(2H)-pyridazone (IV)

2-phenyl-4,6-di(lower alkyl)-3(2H)-pyridazone

As will appear from the foregoing, the comprehensive process referred to above comprises condensing an α- or α, δ-lower alkyllevulinic acid or a lower alkyl ester of either, of Formula I, with phenylhydrazine thereby producing a phenylhydrazone of Formula II; cyclizing the latter thereby producing a dihydropyridazone of Formula III; and dehydrogenating the latter thereby producing a pyridazone of Formula IV.

In the first stage of the comprehensive process referred to above, the condensation of the levulinic acid compound of Formula I with phenylhydrazine is conveniently effected by mixing these two reactants in aqueous or alcoholic solution in the presence of acetic acid. The yield is practically quantitative. Heating accelerates the formation of the phenylhydrazone product II. The latter need not be isolated or purified for further use in the process.

In the second stage of the comprehensive process, the phenylhydrazone of the acid or of the ester, i. e. the product II, is treated to eliminate ROH, i. e. one mol of water (from the phenylhydrazone of the acid) or one mol of alcohol (from the phenylhydrazone of the ester), thereby forming the dihydropyridazone of Formula III. The elimination of ROH and attendant cyclization is advantageously effected by heating the phenylhydrazone II in weakly acidic medium. To this end, phenylhydrazones of α- or α,δ-lower alkyl-levulinic acid esters corresponding to Formula II above are advantageously heated in glacial acetic acid solution; whereas phenylhydrazones of free α- or α,δ-lower alkyl-levulinic acids corresponding to Formula II above are advantageously heated either as such or in solution in an inert solvent. The reaction begins to take place at a temperature between about 60 and about 100 C., and is completed at a temperature between about 150 and 170 C. The yield of the cyclization product III is practically quantitative. Said cyclization product need not be isolated or purified for further use in the process. If desired, the first two stages of the process, i. e. the formation of the phenylhydrazone II and cyclization of the same to III may be combined.

In the last stage of the comprehensive process, two atoms of hydrogen are eliminated from the intermediate of Formula III in order to introduce a double bond in the product IV between carbon atoms numbered 4 and 5. This operation can be effected by treating the product III with a dehydrogenation agent in the presence of which the pyridazone product IV is stable. Illustrative dehydrogenation agents are phosphorous pentachloride and phosphorous oxychloride. In a preferred embodiment of this stage of the comprehensive process, the dihydropyridazone III is refluxed in the presence of a mixture of phosphorous oxychloride with excess phosphorous pentachloride and the reaction product is treated with water and with alkali.

The starting materials of Formula I above can be made from known esters of acetoacetic acid or of γ-lower alkyl acetoacetic acids, according to a process which is conveniently illustrated graphically as follows:

PREPARATION OF STARTING MATERIALS

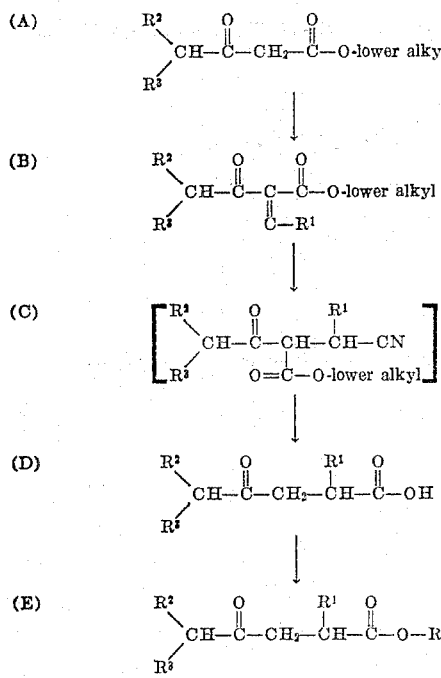

In the above Formulas A to E inclusive, R, $R^1$, $R^2$ and $R^3$ have the same meaning previously indicated.

In the above process for making the starting materials, the acetoacetic acid ester or γ-substituted acetoacetic acid ester of Formula A is reacted with acetaldehyde, propionaldehyde, n-butyraldehyde or isobutyraldehyde, by mixing equimolar quantities of the ester and the aldehyde in the presence of piperidine as a condensing agent at about minus 10° C. The α-lower alkylidene acylacetic acid ester of Formula B thereby obtained is treated in aqueous-alcoholic solution with potassium cyanide at about minus 10° C. The reaction product is refluxed with a mixture of glacial acetic acid and concentrated hydrochloric acid, to effect saponification and decarboxylation with elimination of carbon dioxide, alcohol and ammonia, thereby producing the α- or α,δ-lower alkyl-levulinic acid of Formula D, presumably via the α- or α,δ-lower alkyl-β-carbalkoxy-levulinic acid nitrile of Formula C. The said acid D can be used as a starting material in the process of the invention. Alternatively, the acid D can be converted to its lower alkyl ester of Formula E, also suitable as a starting material in the process of the invention, by heating the acid D in solution in a lower alkanol, in the presence of an esterification catalyst such as hydrogen chloride.

The invention is further disclosed in the following examples, which are illustrative but not limitative thereof.

*Example 1*

144 g. of α-ethyl-levulinic acid was dissolved in 1000 g. of water at 60° C. To this solution was added, while stirring, a mixture of 108 g. of phenylhydrazine, 7 g. of glacial acetic acid and 500 g. of water, whereupon there was an immediate precipitation of the phenylhydrazone of α-ethyl-levulinic acid. The reaction mixture was cooled, the precipitate was filtered off, washed with water and dried in vacuo. It was sufficiently pure for further use in the process. (If desired, the material can be recrystallized from a mixture of ethyl acetate and petroleum ether; the colorless crystals thus obtained have a melting point of 129–131° C.)

The crude phenylhydrazone of α-ethyl-levulinic acid was heated to 170° C. for about ½ to 1 hour, i. e. until a mol of water had been eliminated therefrom. The 2-phenyl-4-ethyl-6-methyl-4,5- dihydro - 3(2H) - pyridazone (205 g.) thus obtained, can, if desired, be purified by distillation in high vacuum; whereupon it distills as a yellow oil of B. P. 130°–135° C./0.01 mm. For further use in the present process, however, such purification was not necessary.

The 205 g. of crude 2-phenyl-4-ethyl-6-methyl-4,5-dihydro-3(2H)-pyridazone obtained above, was mixed with 65 g. of phosphorus oxychloride and 930 g. of phosphorus pentachloride, and the mixture was refluxed for ½ hour. Then the excess phosphorus halides were decomposed by addition of 3000 g. of ice while cooling. A by-product, formed in small amount, was removed by extraction of the reaction mixture with diethyl ether, and then the acidic aqueous solution was set to pH 10 by addition of aqueous NaOH solution. 2-phenyl -4- ethyl - 6 - methyl - 3(2H)-pyridazone was thus precipitated. Thin product was extracted by means of diethyl ether. The residue obtained upon removal of the ether was recrystallized from petroleum ether as a colorless material having M. P. 69°–70° C. The yield was 80% of theory, calculated on α-ethyl levulinic-acid.

*Example 2*

A solution of 158 g. of α-isopropyl-levulinic acid (B. P. 106°–109° C./0.4 mm.) in 1250 g. of warm (60° C.) water was reacted with a mixture of 108 g. of phenylhydrazine, 7 g. of glacial acetic acid and 500 g. of water, in the manner described in Example 1. The thus obtained phenylhydrazone of α-isopropyl-levulinic acid, M. P. 145°–147° C., was heated to 170° C. in order to effect its cyclization, thereby producing 2-phenyl-4-isopropyl-6-methyl -4,5- dihydro - 3(2H) - pyridazone, B. P. 130°–135° C./0.01 mm. The crude cyclization product was dehydrogenated by refluxing with 65 g. of phosphorus oxychloride and 930 g. of phosphorus pentachloride, and the dehydrogenated product was worked up in the manner described in Example 1. 2-phenyl-4-isopropyl-6-methyl-3(2H)-pyridazone, M. P. 65–66° C., was thus obtained in 80% yield.

*Example 3*

A mixture of 17 g. of α-isopropyl-levulinic acid methyl ester (B. P. 92°–93° C./9 mm.), 600 g. of methyl alcohol and 10 g. of glacial acetic acid was reacted with 108 g. of phenylhydrazine. The phenylhydrazone of α-isopropyl-levulinic methyl ester was formed, with spontaneous emission of heat. This product crystallized after a short time. The reaction mixture was cooled to 0° C. to complete crystallization, the crystals were filtered off, washed with cold methyl alcohol and dried in vacuo at room temperature. The dried material (M. P. 117°–119° C.) was refluxed for 4 hours with twice its weight of glacial acetic acid, and then the acetic acid was distilled off completely in vacuo. The residue was a yellow oil of B. P. 130°–135° C./0.01 mm. comprising essentially 2-phenyl-4-isopropyl-6-methyl-4,5-dihydro-3(2H)-pyridazone. It was dehydrogenated as described in Example 2 by refluxing in a mixture of phosphorus oxychloride and phosphorus pentachloride. 2-phenyl-4-isopropyl-6-methyl-3(2H)-pyridazone of M. P. 65°–66° C. was thus obtained, in a yield of 80% of the theoretical calculated on α-isopropyl-levulinic acid methyl ester.

Example 4

A mixture of 158 g. of α-(n-propyl)-levulinic acid, 100 g. of ethanol and 10 g. of glacial acetic acid was reacted with 108 g. of phenylhydrazine. The phenylhydrazone of α-(n-propyl)-levulinic acid was formed, with spontaneous emission of heat, and after a short time the product crystallized out. The precipitation of the product was completed by adding 400 g. of petroleum ether (B. P. 30°–40° C.) and cooling to 0° C. The crystals thus obtained were filtered off and washed with a mixture of ethanol and petroleum ether (1:3). The phenylhydrazone thus obtained melted at 126°–128° C. It was heated to 170° C. in order to effect its cyclization, thereby producing 2-phenyl-4-(n-propyl)-6-methyl-4,5-dihydro-3(2H)-pyridazone, B. P. 135°–140° C./0.01 mm. The crude cyclization product was then dehydrogenated in the manner described in Example 1 by heating with a mixture of phosphorus oxychloride and phosphorus pentachloride, thereby producing 2-phenyl-4-(n-propyl)-6-methyl-3(2H)-pyridazone, M. P. 43°–44° C., in a yield 68% of the theoretical calculated on α-(n-propyl)-levulinic acid.

Example 5

A mixture of 144 g. of α,δ-dimethyl-levulinic acid, 80 g. of ethanol and 10 g. of glacial acetic acid was reacted with 108 g. of phenylhydrazine. After standing for some time, the reaction mixture was taken up in diethyl ether. The ethereal solution was washed with dilute acetic acid and then with water, and the solvent was evaporated. The residue was heated for ½ hour at about 170° C., whereupon the 2-phenyl-4-methyl-6-ethyl-4,5-dihydro-3(2H)-pyridazone (B. P. 121°–122° C./0.13 mm.) thus formed was, without further purification, dissolved in 165 g. of phosphorus oxychloride and refluxed with 900 g. of phosphorus pentachloride for ½ hour. The dehydrogenation product was worked up as described in Example 1. 2-phenyl-4-methyl-6-ethyl-3(2H)-pyridazone, M. P. 55°–56° C., was obtained in a yield of 80%.

Example 6

158 g. of α-ethyl-δ-methyl-levulinic acid, B. P. 90° C./0.05 mm. was reacted with 108 g. of phenylhydrazine in the manner described in Example 5. The phenylhydrazone of α-ethyl-δ-methyl-levulinic acid (M. P. 83°–85° C.) thus formed was taken up in diethyl ether. The ethereal solution was washed with dilute acetic acid and then with water and the solvent was removed. The residue was heated for ½ hour at 150°–160° C., thereby forming 2-phenyl-4,6-diethyl-4,5-dihydro-3(2H)-pyridazone, B. P. 108°–110° C./0.02 mm. The latter product without further purification was dehydrogenated by refluxing with phosphorus oxychloride and phosphorus penachloride in the manner described in Example 5. The 2-phenyl-4,6-diethyl-3(2H)-pyridazone melted at 43°–44° C., yield 83%.

Example 7

158 g. of α,δ,δ-trimethyl-levulinic acid of B. P. 80° C./0.06 mm. was reacted with 108 g. of phenylhydrazine in the manner described in Example 5 and was worked up to yield the phenylhydrazone of the acid. The crude phenylhydrazone product was not further purified, but was heated for a short time at 150°–160° C. 2-phenyl-4-methyl-6-isopropyl-4,5-dihydro-3(2H)-pyridazone, B. P. 121°–122° C./0.12 mm., was thus obtained. The latter was dehydrogenated by heating with phosphorus oxychloride and phosphorus pentachloride as described in Example 5, thereby producing 2-phenyl-4-methyl-6-isopropyl-3(2H)-pyridazone, M. P. 77°–78° C., yield 73%.

Example 8

α-methyl-δ-ethyl-levulinic acid (B. P. 88° C./0.1 mm.) was reacted with phenylhydrazine in the manner described in Example 5, thereby yielding the phenylhydrazone of the acid, M. P. 108°–110° C. Cyclization was effected by heating the phenylhydrazone at 150°–160° C., thereby producing 2-phenyl-4-methyl-6-(n-propyl)-4,5-dihydro-3(2H)-pyridazone, B. P. 124°–125° C./0.12 mm. The latter was dehydrogenated by refluxing with phosphorus oxychloride and phosphorus pentachloride in the manner described in Example 5, thereby producing 2-phenyl-4-methyl-6-(n-propyl)-3(2H)-pyridazone, M. P. 98°–100° C., yield 75%.

We claim:

1. A process which comprises condensing a compound of the formula

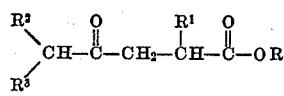

wherein R represents a member selected from the group consisting of hydrogen and lower alkyl, $R^1$ represents lower alkyl, and $R^2$ and $R^3$ each represents a member selected from the group consisting of hydrogen and lower alkyl, the sum of the carbon atoms in $R^1+R^2+R^3$ being an integer from 2 to 3; with phenylhydrazine thereby producing a phenylhydrazone of the formula

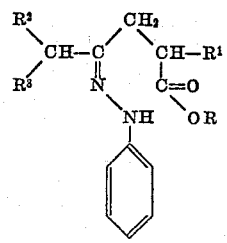

wherein R, $R^1$, $R^2$ and $R^3$ have the same meaning as above; cyclizing said phenylhydrazone, by heating it in weakly acidic medium, thereby producing a dihydropyridazone of the formula

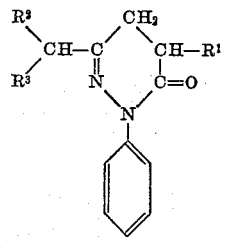

wherein $R^1$, $R^2$ and $R^3$ have the same meaning as above; and dehydrogenating the dihydropyridazone, by heating it with material selected from the group consisting of phosphorus oxychloride, phosphorus pentachloride and mixtures thereof, thereby producing a compound of the formula

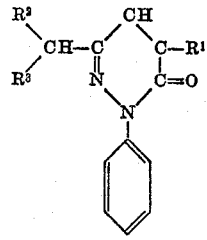

wherein $R^1$, $R^2$ and $R^3$ have the same meaning as above.

2. A compound of the formula

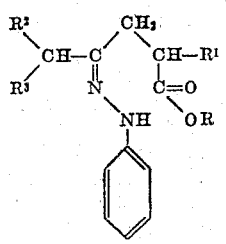

wherein R represents a member selected from the group consisting of hydrogen and lower alkyl, $R^1$ represents lower alkyl, and $R^2$ and $R^3$ each represents a member selected from the group consisting of hydrogen and lower alkyl, the sum of the carbon atoms in $R^1+R^2+R^3$ being an integer from 2 to 3.

3. A process of making a compound according to claim 2 which comprises condensing with phenylhydrazine a compound of the formula

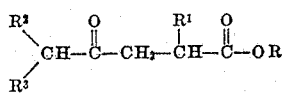

wherein R represents a member selected from the group consisting of hydrogen and lower alkyl, $R^1$ represents lower alkyl, and $R^2$ and $R^3$ each represents a member selected from the group consisting of hydrogen and lower alkyl, the sum of the carbon atoms in $R^1+R^2+R^3$ being an integer from 2 to 3.

4. A compound of the formula

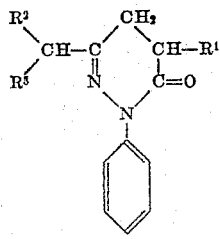

wherein $R^1$ represents lower alkyl, and $R^2$ and $R^3$ each represents a member selected from the group consisting of hydrogen and lower alkyl, the sum of the carbon atoms in $R^1+R^2+R^3$ being an integer from 2 to 3.

5. A process of making a compound according to claim 4 which comprises cyclizing a phenylhydrazone of the formula

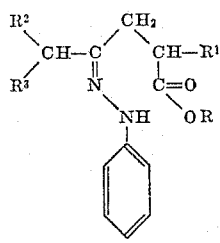

wherein R represents a member selected from the group consisting of hydrogen and lower alkyl, $R^1$ represents lower alkyl, and $R^2$ and $R^3$ each represents a member selected from the group consisting of hydrogen and lower alkyl, the sum of the carbon atoms in $R^1+R^2+R^3$ being an integer from 2 to 3, by heating said hydrazone in weakly acidic medium.

6. A compound of the formula

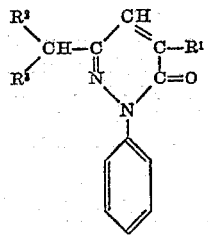

wherein $R^1$ represents lower alkyl, and $R^2$ and $R^3$ each represents a member selected from the group consisting of hydrogen and lower alkyl, the sum of the carbon atoms in $R^1+R^2+R^3$ being an integer from 2 to 3.

7. A process of making a compound according to claim 6 which comprises dehydrogenating a dihydropyridazone of the formula

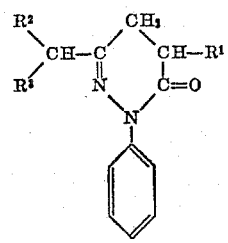

wherein $R^1$ represents lower alkyl, and $R^2$ and $R^3$ each represents a member selected from the group consisting of hydrogen and lower alkyl, the sum of the carbon atoms in $R^1+R^2+R^3$ being an integer from 2 to 3, by heating said dihydropyridazone with material selected from the group consisting of phosphorus oxychloride, phosphorus pentachloride and mixtures thereof.

8. 2-phenyl-4-isopropyl-6-methyl-3(2H)-pyridazone.

9. 2-phenyl-4,6-diethyl-3(2H)-pyridazone.

References Cited in the file of this patent

UNITED STATES PATENTS 2,624,730  Steck _____ Jan. 6, 1953

OTHER REFERENCES

Homer et al.: J. Chem. Soc., 1948, 2191–94.
Gregory: J. Chem. Soc., 1949, 2546–49.